United States Patent
Corcoran

(10) Patent No.: US 9,736,348 B2
(45) Date of Patent: Aug. 15, 2017

(54) RAW CAMERA PERIPHERAL WITH HANDHELD MOBILE UNIT PROCESSING RAW IMAGE DATA

(71) Applicant: 2P & M Holdings, LLC, Williamsville, NY (US)

(72) Inventor: Peter Corcoran, Galway (IE)

(73) Assignee: 2P & M Holdings, LLC, Williamsville, NY (US)

(*) Notice: Subject to any disclaimer, the term of this patent is extended or adjusted under 35 U.S.C. 154(b) by 0 days.

(21) Appl. No.: 14/725,992

(22) Filed: May 29, 2015

(65) Prior Publication Data

US 2016/0352999 A1      Dec. 1, 2016

Related U.S. Application Data

(63) Continuation of application No. 14/724,305, filed on May 28, 2015.

(30) Foreign Application Priority Data

Jun. 3, 2014  (IE) ................................. S2014/0133
Jun. 3, 2014  (IE) ................................. S2014/0134
(Continued)

(51) Int. Cl.
*H04N 5/232*    (2006.01)
*G06T 3/40*     (2006.01)
*H04N 5/225*    (2006.01)

(52) U.S. Cl.
CPC ....... *H04N 5/23203* (2013.01); *G06T 3/4015* (2013.01); *H04N 5/2253* (2013.01);
(Continued)

(58) Field of Classification Search
CPC ........ G06F 3/048; G06F 3/0416; G06F 3/005; G06F 2203/00; G06F 3/01;
(Continued)

(56) References Cited

U.S. PATENT DOCUMENTS

2008/0240697 A1*  10/2008  Marcus ................. G03B 17/38
                                                                        396/58
2011/0058052 A1*   3/2011  Bolton ................ H04M 1/7253
                                                                       348/211.99
(Continued)

*Primary Examiner* — Mekonnen Dagnew
(74) *Attorney, Agent, or Firm* — Seth A. Horwitz

(57) ABSTRACT

A handheld imaging device is described to provide high quality RAW image data to a smartphone, or similar handheld imaging device. The imaging device can have a larger dimension, particularly with regard to the thickness of the device, thus overcoming some of the physical limitations to providing high quality optics and image sensing within the thin form factor of a modern smartphone. As the device is only connected when capturing images the smartphone form factor is not altered. The device does not replicate the high-end image processing functionality of a smartphone, but instead transfers RAW images to the smartphone for high-end image processing & enhancement on the smartphone CPU/GPU. Thus it can be manufactured at lower cost than a dedicated camera with equivalent capabilities by taking advantage of the sophisticated image processing capabilities of today's smartphones.

20 Claims, 11 Drawing Sheets

(30) Foreign Application Priority Data

Jun. 3, 2014 (IE) .................................. S2014/0135
Jun. 3, 2014 (IE) .................................. S2014/0136

(52) U.S. Cl.
CPC ....... *H04N 5/2254* (2013.01); *H04N 5/23216* (2013.01); *H04N 5/23293* (2013.01)

(58) Field of Classification Search
CPC ............. H04N 1/00408; H04N 1/0035; H04N 1/00381; H04N 1/00315; H04N 1/00103; H04N 1/00307; H04N 1/32776; H04N 2201/0055; G08B 13/19682; G08B 13/1966
See application file for complete search history.

(56) References Cited

U.S. PATENT DOCUMENTS

| | | | | |
|---|---|---|---|---|
| 2014/0085334 A1* | 3/2014 | Payne | ............... | H04M 3/42382 345/633 |
| 2014/0119602 A1* | 5/2014 | Zuo | ....................... | G06T 7/2033 382/103 |
| 2015/0049202 A1* | 2/2015 | Okabe | .................... | G03B 17/02 348/207.1 |
| 2015/0281710 A1* | 10/2015 | Sievert | ................. | H04N 19/164 375/240.02 |

* cited by examiner

RAW CAMERA PERIPHERAL WITH HANDHELD MOBILE UNIT PROCESSING RAW IMAGE DATA

CROSS-REFERENCE

Priority is claimed from Irish Pat. App. No. S2014/0135, filed Jun. 3, 2014, and issued as Irish Pat. No. S86536 on Apr. 14, 2015; Irish Pat. App. No. S2014/0136, filed Jun. 3, 2014, and issued as Irish Pat. No. S86520 on Mar. 3, 2015; Irish Pat. App. No. S2014/0134, filed Jun. 3, 2014, and issued as Irish Pat. No. S86537 on Apr. 14, 2015; and Irish Pat. App. No. S2014/0133, filed Jun. 3, 2014, and issued as Irish Pat. No. S86519 on Mar. 3, 2015; all of which are hereby incorporated by reference.

FIELD

The invention is in the field of consumer imaging, more specifically an imaging add-on device for a smartphone.

BACKGROUND

Modern smartphone devices have settled on a compact and thin format. While this is convenient for the user, both in terms of carrying the device in a pocket and holding it in the hand while in use as a mobile phone it creates difficulties in resolving a high-quality optical image. Thus while the camera modules in today's smartphones have continued to improved in term of pixel resolutions, speed of image acquisition and a wide range of digital manipulation of the underlying image the optical quality is constrained by the physical limitations of the device form factor and the corresponding size of image sensor that can be accommodated within the device.

Some attempts have been made to improve the image quality by providing additional lens elements that clip onto the device over the existing camera lens to increase the zoom, enhance the field-of-view, or to provide improved macro capabilities. However these optical add-on lenses are constrained to the design parameters of the original lens system and the size of the internal sensor element of the smartphone (Dainty 2012).

Some manufacturers have created independent camera modules that communicate with a smartphone via wireless communications such as Wifi (IEEE 802.11). These modules can be attached to the case of a smartphone or may be operated completely independently of the smartphone. They export a control user inferface (UI) for the camera and images are captured in the camera module and compressed to JPEG format (or MPEG format for video) prior to being transferred wirelessly to the controlling smartphone unit.

While these devices can obtain high-quality compressed images and video and may be controlled and operated from the smartphone, they do not support the acquisition of high quality RAW (Bayer) images. Furthermore they require a high-end full imaging system, including dedicated image signal processor (ISP) and main system CPU/GPU and JPEG (images) or MPEG (video) compression engine to be provided within the independent camera module.

With current state of prior art we see that improved imaging can be achieved on handheld imaging devices such as smartphones either by adding (i) an enhanced clip-on lens, or (ii) by connecting a dedicated and fully-independent camera module to the smartphone over a wireless (or wired) link. The first solution is limited by the original optical design and image sensor of the smartphone. The second approach overcomes these limitations but requires a full imaging pipeline and compression engine in order to process and compress images that are suitable for transfer over a wireless link.

Thus there is a need for an add-on peripheral that improves the optical acquisition, and can accommodate a larger sensor size (APC or full-frame) but that can also take advantage of the inbuilt image processing capabilities and system-level 'apps' of the smartphone. There is a further need for advanced user interfaces enabling accurate and simplified control of complex digital camera acquisition parameters by users who are not familiar with the operation of advanced DSLR and mirrorless cameras.

SUMMARY

For a better understanding it is useful to consult US 2013/0004071 Image signal processor architecture optimized for low-power, processing flexibility, and user experience to Chang et al. This describes an image signal processor architecture that may be optimized for low-power consumption, processing flexibility, and/or user experience. In one embodiment, an image signal processor may be partitioned into a plurality of partitions, each partition being capable of entering a lower power consumption state. Techniques for the partitioning of an ISP as described in this patent application may be used advantageously in the present invention.

An example ISP is shown in FIG. 2, taken from this patent application. It can be seen that the ISP as shown in FIG. 1 is significantly more complicated. In a practical embodiment the first partition of the ISP shown in FIG. 2, that is 202, would be equivalent to the Bayer ISP of FIG. 1. The other functional elements of the ISP, that is 204 and 206, 208 would be implemented on the host smartphone.

FIG. 3 shows the MIPI interface between a sensor and ISP, taken from www.mipi.org and based on CSI-2 variant. The latest practical embodiments are known as M-Phy™ (physical layer) and UniPro™ (protocol stack). US-2013/0191568 Operating m-phy based communications over universal serial bus (usb) interface, and related cables, connectors, systems and methods to Hershko et al. describes how M-Phy (MIPI) interfaces can be controlled and data transfers achieved via a USB-3 interface.

Thus a physical example of the present invention is presented in FIGS. 4A and 4B which illustrates the camera module with external USB interface. A smartphone with external USB connector can be attached on top of said module and the module is then operated and controlled via the USB interface. The internal details of the camera module are illustrated in FIG. 1 and the internal architecture of an exemplary smartphone configured to connect to the device is shown in FIG. 5.

Various detail of this invention and in particular alternative embodiments providing advanced user interfaces will be documented in the following sections.

DETAILED DESCRIPTION OF SAMPLE EMBODIMENTS

In a preferred embodiment the camera module is configured with a full-size DSLR or APS-C image sensor and incorporates a lens mount compatible with a DSLR manufacturer. This allows the module to use any lens design from that particular camera maker. In addition the module will provide various electrical and mechanical interfaces as required to operate the lens type(s) of that manufacturer. For example, U.S. Pat. No. 8,452,170 Digital single lens reflex camera to Hwang et al describes details of one such exemplary interface. This document, U.S. Pat. No. 8,452,170, is incorporated by reference.

The camera module will also include exposure, auto-focus, shutter (capture) and zoom control subsystems compatible with the lens types of the relevant manufacturer.

The Raw Camera Module
Physical Embodiments

Figure 4B:
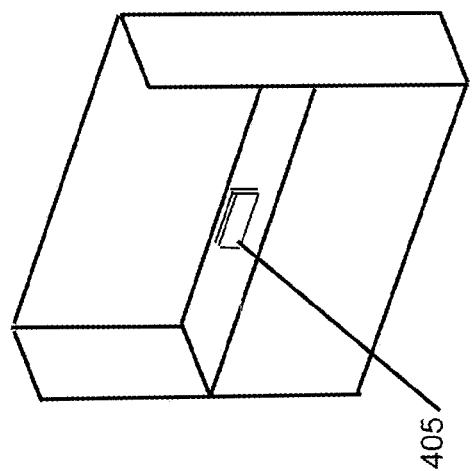
FIG. 4B: Camera module with USB connector and full-size lens module.
Figure 4A:
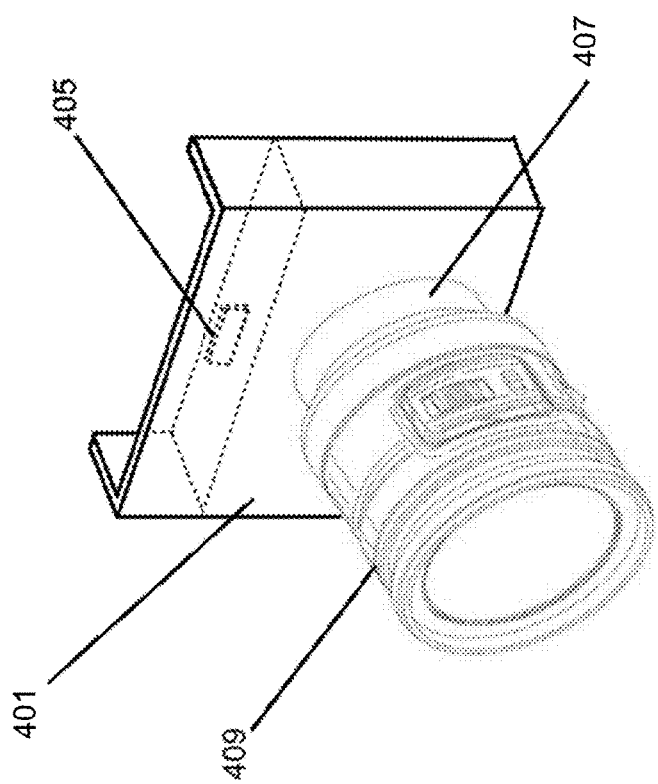
FIG. 4A: Camera module with USB connector and full-size lens module.
Figure 7B:
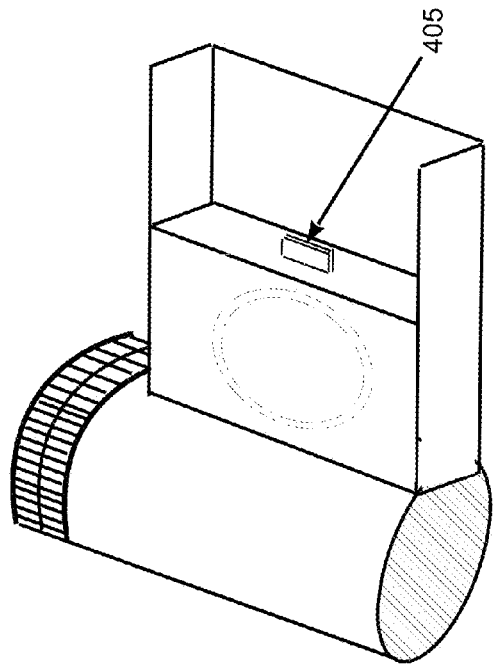
FIG. 7B: RAW module with interchangeable hand-grip; and configured to receive smartphone in a landscape orientation.
Figure 7A:
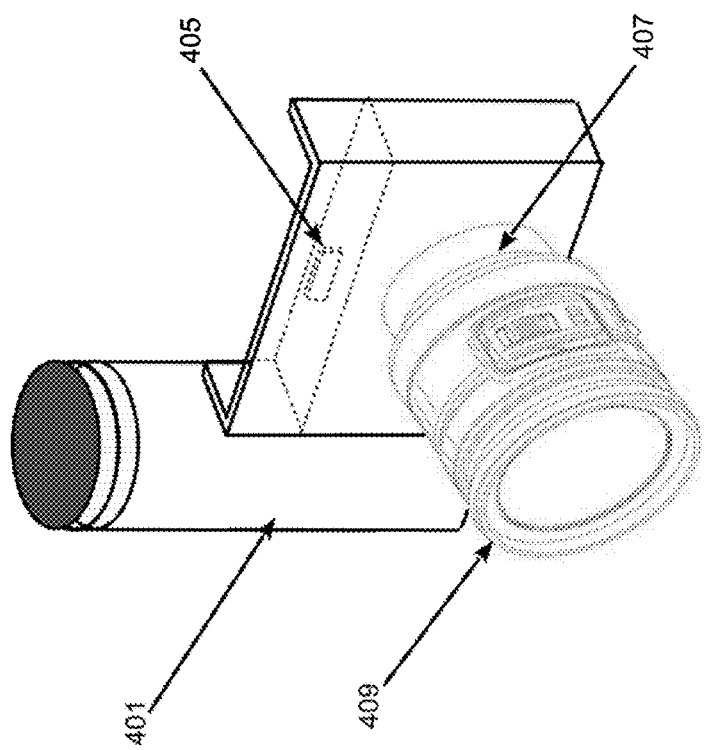
FIG. 7A: RAW module with interchangeable hand-grip; and configured to receive smartphone in a landscape orientation.

The main embodiment is shown in FIG. 4A with a rear-view in FIG. 4B. An alternative embodiment is shown in FIG. 7.

The RAW camera module comprises a main body [401] which is of greater depth than the smartphone and is provided with clamps, bindings or other fixing mechanisms (not shown) to facilitate connecting the smartphone to the module in a robust manner. The smartphone will be connected electrically to the module via a USB-3 or similar high-speed data port [405] and in the embodiment shown in FIG. 4A will be mounted in a portrait orientation.

In certain embodiments the RAW module also features a lens mount [407] that facilitates interchangeable lenses [409]. Electrical connectors are also provided in the lens mount to enable on-lens switches and controls to provide settings information to the lens control subsystem [109] of the RAW module (shown in FIG. 1).

In certain embodiments the RAW module includes a hand grip (FIG. 7A) that improves handing of the device. This handgrip may be detachable so that it can be switched from left-hand to right-hand side and thus facilitate use of the module by left-handed photographers. In other embodiments the module may be configured to allow the smartphone device to be connected in a landscape orientation allowing a widescreen user-interface to be provided.

Internal Organization of the Module

Figure 1:
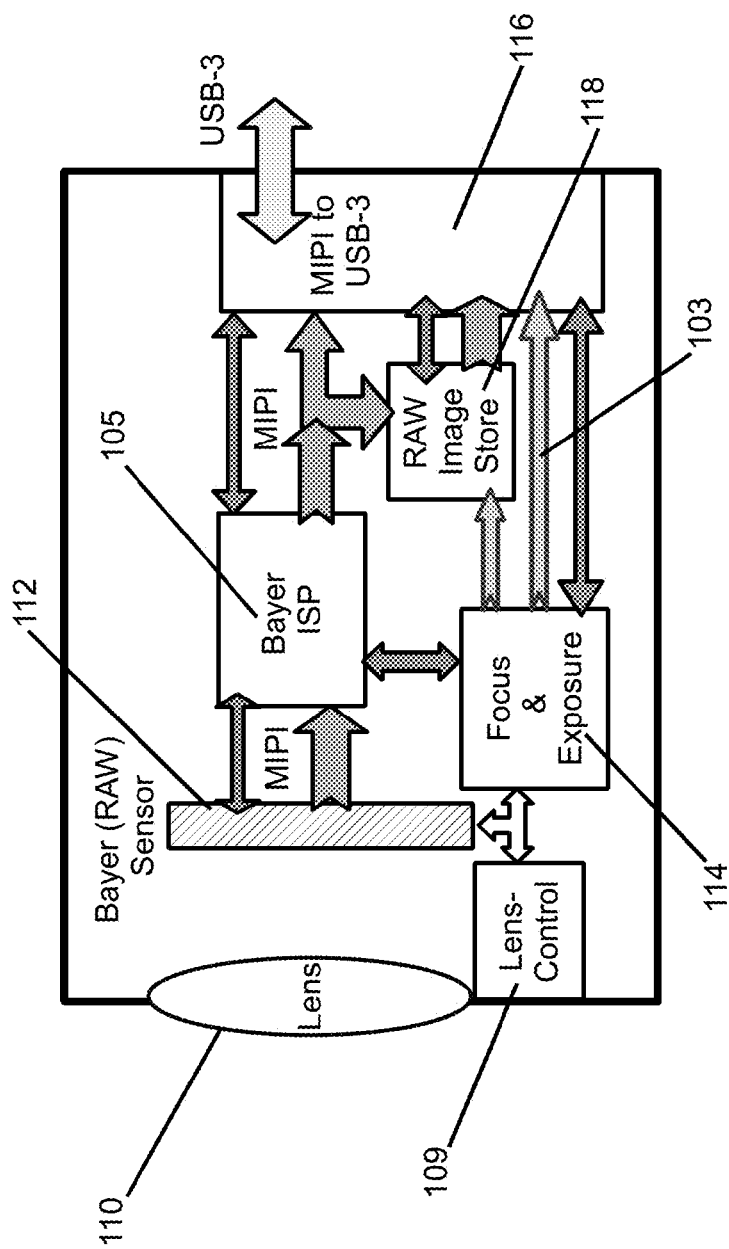
FIG. 1 illustrates the RAW camera peripheral Module with the main sub-components required for various embodiments.

This is shown in FIG. 1. A lens [110] is typically provided as a separate component that can be removed and replaced with another lens with different properties. As with digital single lens reflex (DSLR) cameras this allows a variety of wide-angle, macro and telephoto lenses to be used to acquire images in different photographic situations. As such lenses are relatively large it does not make sense to adapt a smartphone to accommodate removable lens assemblies, but the RAW module enables the use of such lens assemblies when the smartphone is connected.

In addition to the lens assembly the RAW module also incorporates a lens control [109] (and optionally a lens driver/motor, not shown) and focus and exposure control subsystems [114]. The purpose of the lens control is to drive the movable lens elements as required by the focus subsystem.

In some embodiments a phase focus subsystem may be used and this may include an additional sensing element. Alternatively a simple contrast based focusing system may be employed and the focus subsystem will use either RAW data direct from the image sensor, or may use the ISP to pre-process certain RAW image data. In any case the contrast based focus subsystem uses selected portions of the full image scene and measures the contrast levels within these regions to determine the effects of changing the lens position. A range of other focus sensing approaches are described in the literature and may be adopted here.

The lens assembly may also include an aperture ring that allows changing the size of aperture that admits light into the camera and onto the image sensor [112]. It is also possible to adjust the time interval during which image data is accumulated by the pixels of the imaging sensor. Typically this will be a CMOS sensor and controlling the combination of lens aperture and the accumulation interval for image data by pixels of the sensor is equivalent to exposure control. As both focus and exposure control subsystems interact with the lens assembly, the imaging sensor and potentially the Bayer-ISP these are shown as a single system block [114] in FIG. 1.

The image sensor [112] is typically a CMOS image sensor. This comprises a pixel array ranging in size from 5 Megapixel with the largest in use in consumer products being of the order of 40 Megapixels. Also the size of this sensor is important as higher image quality is obtained by using a larger image sensor. In smartphones a relative small sensor is typically used—this can be as small as 25 sq mm (25 $mm^2$) up to just over 100 sq mm (100 $mm^2$); large sensor sizes that are more suitable for the RAW peripheral include 4/3 sensors (225 $mm^2$), APS-C (320-370 $mm^2$) or APS-H (550 $mm^2$).

In addition to a larger sensor the RAW Module also includes a specialized image signal processor (ISP) unit

[105]. This specialized module is optimized to accelerate processing of the RAW image data and in a typical embodiment will provide the various Bayer processing functions described by [202] of FIG. 2. In some embodiments this processed Bayer data is transmitted directly to the smartphone but in alternative embodiments it may be further processed to YUV, YCC or RGB color spaces. The provided color space and the pre-processing provided will depend on an initialization process when the smartphone is first connected to the module. In some embodiments it may be possible to change this configuration from the connected smartphone, or by means of a mode switch on the module, if provided.

The transmitting of an image frame to the connected smartphone is managed by a MIPI to USB-3 interface subsystem [116].

The Image Processing Pipeline

This typically refers to a range of image processing that is applied to a RAW (Bayer pattern) image that is obtained from an image sensor. The Bayer pattern is well known to those skilled in the art and employs additional sensing elements that are responsive to green wavelengths.

The origins of this nomenclature stretch back to Bryce Bayer's patent (U.S. Pat. No. 3,971,065) in 1976 where the inventor refers to the green photo-sensors as luminance-sensitive elements and the red and blue ones as chrominance-sensitive elements. He used twice as many green elements as red or blue to mimic the physiology of the human eye. The luminance perception of the human retina uses M and L cone cells combined, during daylight vision, which are most sensitive to green light. These elements are referred to as sensor elements or pixel sensors, or simply pixels; sample values sensed by them, after interpolation, become image pixels.

The raw output of Bayer-filter cameras is referred to as a Bayer pattern image. Since each pixel is filtered to record only one of three colors, the data from each pixel cannot fully specify each of the red, green, and blue values on its own. To obtain a full-color image, various demosaicing algorithms can be used to interpolate a set of complete red, green, and blue values for each pixel. These algorithms make use of the surrounding pixels of the corresponding colors to estimate the values for a particular image pixel.

Note that different camera manufacturers have arranged the storage of Bayer data in different, proprietary, file formats. Also, some cameras use variations on the original Bayer color filter array with different sensor pixel distributions, or use additional sensor pixels of enhanced sensitivity. The generic term of RAW image data is widely used in the digital imaging industry to refer to the unprocessed sensor data. Throughout this document when reference is made to Bayer data or RAW image data the intended scope is any data captured at the full data resolution (typically 12- or 14-bit) as read out from each of the camera's image sensor pixels and not the narrower scope as defined in U.S. Pat. No. 3,971,065.

Now, returning to our description of the image processing pipeline, after the demosaicing process a conventional RGB image is provided but this still requires additional processing. More specifically the adjustment of the image to provide gamma correction, white balance and color tone balance. Each of these image adjustments are scene dependent and determining and applying each requires some computation based on statistical analysis of the acquired image.

Figure 2:
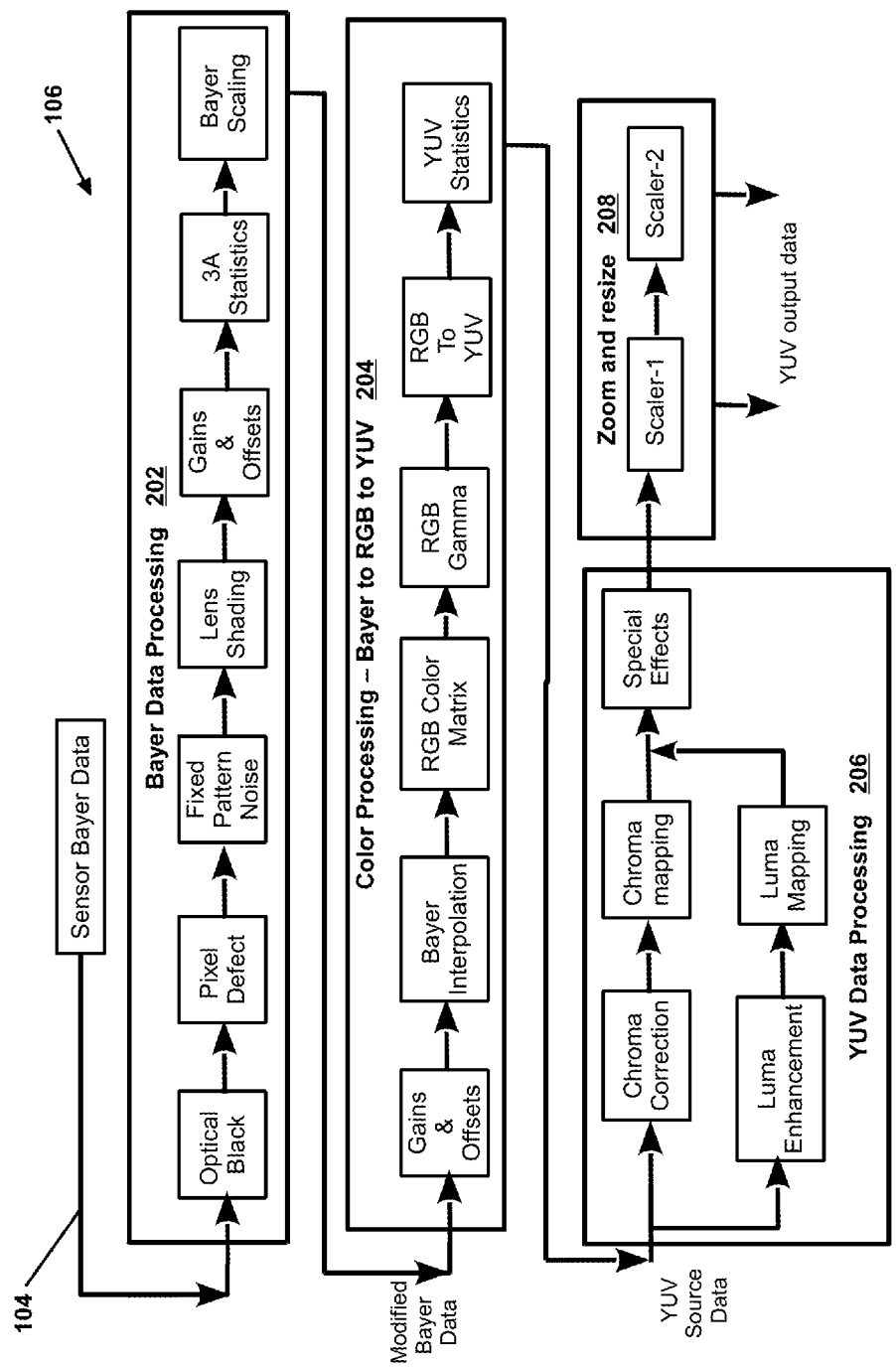
FIG. 2 illustrates the various functions of an example Image Signal Processor pipeline showing partitioning of functionality to allow more energy efficient operation (from US 2013/0004071). The present invention employs similar partitioning to allow separation of the RAW (Bayer) processing from higher level image processing functions.
Figure 3:
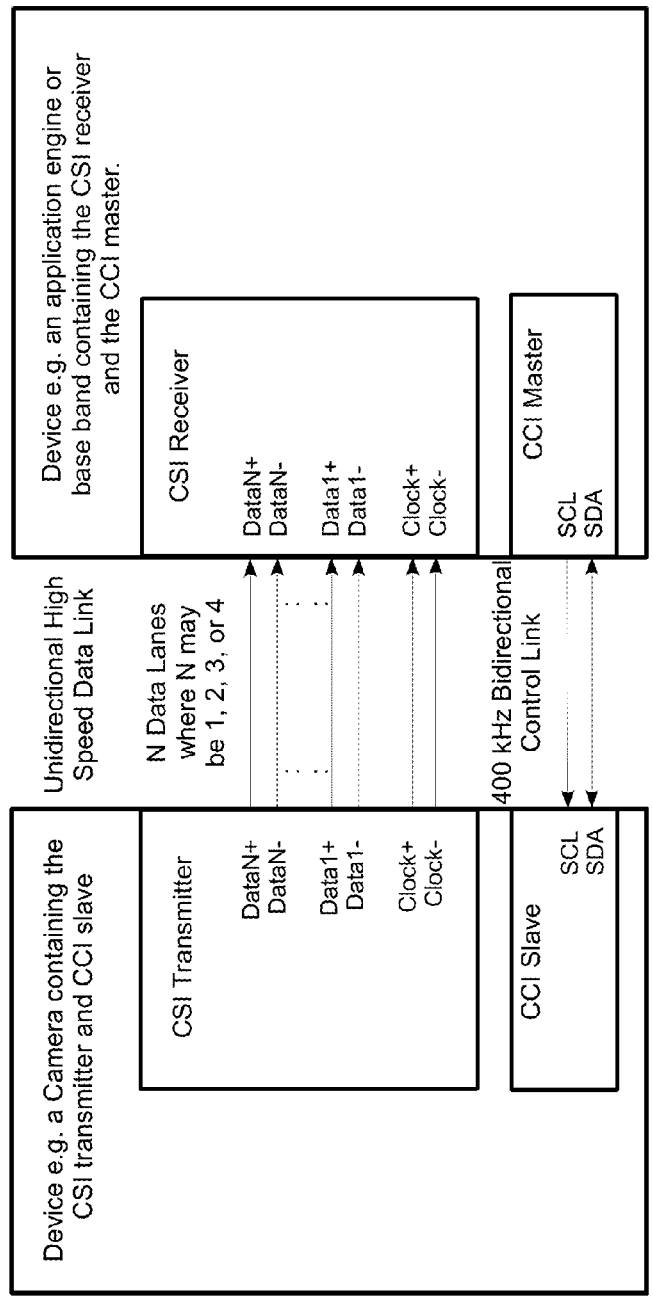
FIG. 3: Shows a generic MIPI interface. MIPI is used by most state-of-art handheld imaging devices to interface between camera-sensor and ISP; the CCI interface is a bidirectional command & control interface based on I2C signaling protocols, while the CSI interface is a unidirectional interface for offloading bulk image data from the sensor.

The image is then typically converted into YCC or YUV color space as this facilitates further manipulation of image luminance (Luma) and color (Chroma) and eventually image compression to JPEG format. An exemplary image processing pipeline is illustrated in FIG. 2. In a modern digital imaging device the bulk of the processing pipeline [106] is implemented in a dedicated processing unit known as an image signal processor (ISP). The use of a dedicated processing unit allow for the use of dedicated hardware functions that would normally be provided by software. These dedicated hardware functions can process image data at significantly higher rates than a pure software implementation.

In FIG. 2 the ISP pipeline comprises several distinct elements. First the sensor data [104] is input to a first Bayer data processing unit [202] that performs a number of exemplary functions including compensating for defect pixels on the sensor, correcting fixed pattern noise, adjusting for lens shading (luminance decreases towards outside of lens), calculating image statistics (e.g. histograms) and Bayer scaling. This modified Bayer data is next passed to a demosaicing and conversion block [204] that generates first a RGB image, then after adjustment of the RGB it further converts the image to YCC or YUV format. A third block [206] performs further adjustments on the YUV source data and a fourth block is often present and allows image re-scaling [208] to provide, for example, a preview stream to display on the screen of the imaging device.

In state-of-art imaging devices all four main processing blocks, [202], [204], [206] and [208] are provided in a single system-on-chip or application specific processor known generically as an image signal processor (ISP).

In a state-of-art imaging device it is likely that further processing (e.g. high dynamic range (HDR), specialized filters, face and eye tracking, smile detection or red-eye filter) will be performed on the main CPU/GPU of the device. As these algorithms are frequently tuned and adjusted they are more suited to a software implementation rather than providing dedicated hardware.

This leads to the underlying inventive concept which is to split the Bayer and lower-level image processing into a separate peripheral and by bypassing the internal sensor and ISP of the smartphone and providing RAW image data (or RGB/YUV/YCC in some embodiments) directly to the smartphone from an external peripheral optimized to provide high-quality optical and sensor subsystems similar to those found in DSLR or high-end mirrorless cameras.

Internal Organization of the Smartphone

Figure 5:
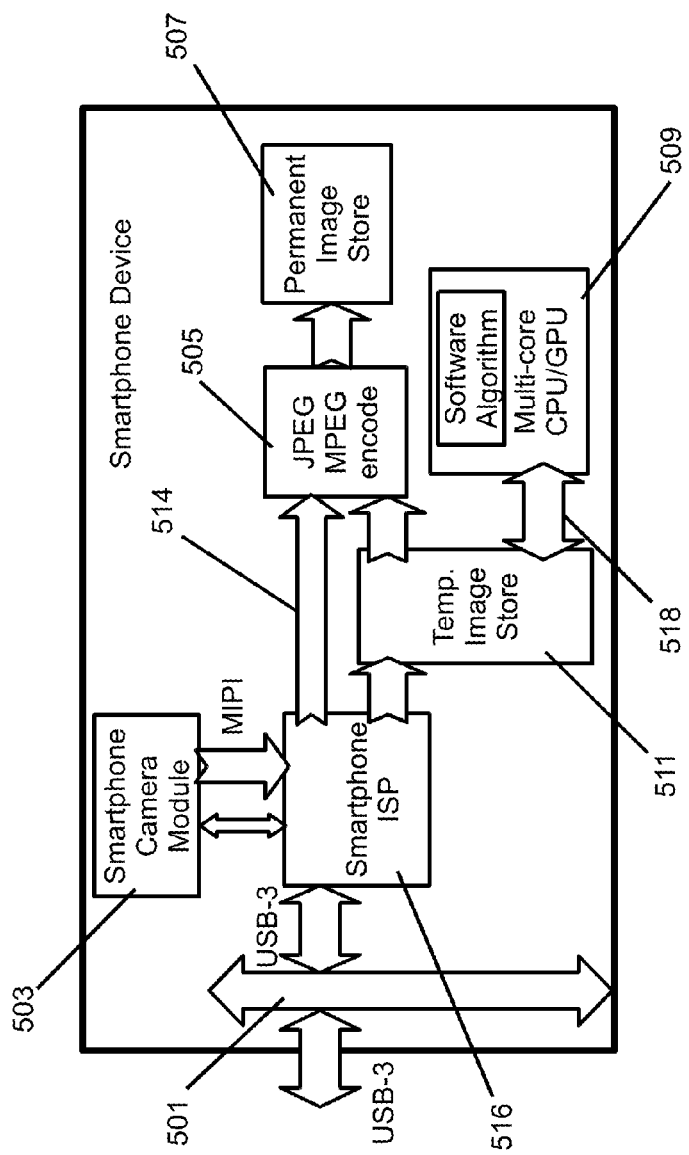
FIG. 5: Smartphone configuration to interface with camera module.

This is shown in FIG. 5. The smartphone contains a camera module [503] that is typically designed independently of the main phone. It will typically be interfaced with the main device using MIPI (M-Phy physical interface) and in most modules only the lower level Bayer processing corresponding to [202] in FIG. 2 is provided within the module.

Other processing corresponding to [204], [206] and [208] is typically performed in a dedicated ISP component [516] and a pre-processed RGB or YCC/YUV image is passed on to the main CPU/GPU [509] for more complex analysis and post-processing. Where such processing is performed it is typically required to store the image, or portions thereof, in a temporary image store [511] and image portions may be moved back and forth via internal data bus [518] between the main CPU/GPU [509] and this image store. Once processing of the YCC/YUV/RGB image is finalized it is sent to the compression module [505] and permanent storage [507].

Where additional analysis and processing is not required the image may simply be sent via internal data bus [514] for compression [505] and permanent storage [507].

Returning to the smartphone camera module [503] and ISP [516] we note that the standard for external data connections on mobile devices is typically the USB-3 standard. Many smartphone devices incorporate a USB-3 module and can be interfaced with external USB-3 peripherals either directly, or using a specialized adapter.

Now US-2013/0191568 "Operating m-phy based communications over universal serial bus (usb) interface, and related cables, connectors, systems and methods" to Hershko et al. describes how M-Phy (MIPI) interfaces can be controlled and data transfers achieved via a USB-3 interface.

Thus it will be understood that the ISP [516] in FIG. 5 which normally accesses the camera module [503] using MIPI interface to obtain digital images could be modified to issue a similar set of MIPI commands to a remote device over the USB-3 bus [501] and to accept digital image data from a remote source connected to the same USB-3 bus. A detailed description of such technique is given in US-2013/0191568, hereby incorporated by reference.

Thus in a preferred embodiment when the RAW camera peripheral is connected to the smartphone the ISP is notified and can be configured to access the RAW peripheral rather than the internal smartphone camera module. This provides high quality RAW images to the smartphone ISP and after further processing to the main CPU/GPU and compression module for eventual storage [507].

We next explain how manual controls on the RAW peripheral can be used to set and configure the acquisition settings in a number of embodiments.

Manual Controls

In certain embodiments manual controls may be added to the body of the module to enable manual adjustment of these subsystems, however they may also be operated from the smartphone UI as will be explained shortly. Where manual controls are provided an additional microcontroller (not shown) may be added to determine and interpret the state of various manual settings and may determine other settings based on look-up tables (LUTs) or calculated from pre-programmed formulae. Where provided this microcontroller will also store settings, typically on a dedicated non-volatile storage and communicate these settings and the configured 'state' of the module to the module-ISP.

In turn the module ISP will make such information available to the connected smartphone via the MIPI-to-USB communications link. Thus where controls for manual settings are provided these will update the state of the module as communicated to the smartphone, which will, in turn, adjust its UI to reflect the changed state. In some embodiments a low-cost, low power LCD display may be provided and managed by the microcontroller. This enables the user to set and check acquisition parameters directly on the module without a need to consult the smartphone display.

In some embodiments a selection switch is provided that can disable the manual controls on the body of the camera module and allow it to be controlled directly from the smartphone UI and touchscreen. In alternative embodiments the decision to enable or disable manual controls may be determined by the model of smartphone that is connected to the peripheral.

The module may also provide an external video-mode, or video-capture switch.

A mode selection switch similar to that provided on modern cameras that allows the module to be switched into fully-automatic, semi-automatic (aperture or shutter priority or exposure EV number), and fully manual modes may also be provided.

In alternative embodiments the camera module may not provide manual controls, but can be entirely controlled from the touchscreen interface of the smartphone.

In some embodiments the peripheral may include un-numbered adjustment dials for shutter time, aperture, ISO settings or equivalent. These dials allow the values for each setting to be adjusted up(+) or down(−) and the result will be stored in the smartphone app. Thus a photographer may control settings as with a normal camera, using conventional dials even though the setting values are stored in the corresponding smartphone app.

Hardware Processing

In a preferred embodiment the camera module contains a basic image signal processor that operates only on RAW Bayer images. Some dedicated hardware enhancements may be provided to support high quality image acquisition. Typically these will determine one or more characteristics of an image frame and apply the results to modify the acquisition of a following frame.

More specifically focus sharpness may be calculated and provided to an auto-focus subsystem; averaged pixel luminance across blocks or regions of the image may be determined and used as input to an auto-exposure sub-system; frame to frame motion can be estimated using integral projection techniques (summing rows & columns of each image frame) and a combination of these techniques applied to sub-regions of the image frame can be used to determine frame-to-frame motions, both translational and rotational. When working on raw images the green channel is frequently used as equivalent to the luminance channel.

In certain embodiments more advanced hardware techniques may be employed. For example a basic face detector can be implemented using a small number of the most inclusive haar classifiers (Cho et al. 2009; Tresadern et al. 2011; Yang et al. 2010) and can provide information on regions of the image; by further separating such classifiers into symmetric and non-symmetric we can also find partial faces (Corcoran et al. 2013). However the hardware engines being incorporated in smartphones should be employed where practical, thus most of the hardware incorporated into the camera module is targeted to improve raw image acquisition. Refinement and enhancement of the acquired image will mainly be achieved by the smartphone ISP.

Camera Module Operating Modes

The camera module ISP communicates with the image sensor over a MIPI interface to acquire a full image frame. This may be initiated by the smartphone, but may also be initiated by a manual shutter/capture button where provided. When a full capture has not been initiated the camera module defaults to a "preview-stream" mode, unless it has entered a sleep state.

Preview Stream Mode

In the preview stream mode the module-ISP continually acquires a lower resolution image frame—typically matched to the smartphone UI—and transmits this to the smartphone over the USB-3 interface. If auto-focus is active the focus subsystem adjusts the focus position from frame to frame to achieve the sharpest focus setting. If manual focus is active then the focus is only changed in response to adjustments of the attached lens. The preview stream from the camera module is further processed by the smartphone-ISP to provide an RGB/YCC image stream for display on the smartphone touchscreen. Other 'controls' may be provided on the touchscreen, allowing the user to manually adjust acquisition parameters and camera module settings.

The preview stream may be buffered on a temporary basis in the raw image buffer on the camera module. Typically this will be only for a limited number of image frames and after this fixed number of frames the buffer will be overwritten. However this allows a history of recent image frames to be retained and possibly used to enhance the current (latest) image frame without placing a memory load on the smartphone. Select portions of buffered image frames may be uploaded as required by image processing algorithms on the smartphone.

Metadata from the acquisition subsystems can be saved with the corresponding image frames in the temporary image store. This includes focus, exposure and zoom data as well as time & date of acquisition.

In some embodiments it may include metadata associated with hardware enhancements provided on the camera module or built into the ISP. For example, if a hardware face detector was provided this metadata might indicate if potential face regions were detected in an image and, if so, how many potential face regions were found (overlapping detections may be counted as just a single face) and the XY locations of potential face regions.

Other useful hardware functions might include flash-eye detection, calculation of an integral image, integral projection vectors, various image histograms, foreground/background and sharpness/contrast maps.

In some embodiments additional hardware subsystems such as GPS may be included and thus location data could also be provided.

Initialization

The RAW camera module includes an independent power subsystem, and battery. It may operate in different embodiments as a USB master, or USB slave but in either case the device is self-powered. In certain embodiments it may include a substantial battery pack, serving as a reserve power source for a smartphone.

When the peripheral is first attached to the smartphone the two devices will exchange configuration information.

In some preferred embodiments the peripheral will be controlled from a dedicated camera app on the smartphone and this app will give access to low-level system features of both the smartphone, including direct access to the internal camera module interfaces of the smartphone and the peripheral via the USB to MIPI interface module.

In alternative embodiments control may be from external camera controls—similar to the control knobs provided on a typical DSLR camera—and the peripheral will communicate these settings to the attached smartphone (which may optionally display them). It is possible for the peripheral to provide functionality to operate in both modes, but not at the same time—thus some configuration of the peripheral, either by an external mode switch, or a non-volatile internal state may be needed.

After the two devices have completed this configuration phase the peripheral will typically be configured in its normal operational mode of image acquisition. The smartphone will also enter a custom configuration where the low-level image acquisition functions of its camera subsystem, specifically the optical and sensor components, are disengaged at the smartphone ISP interface, and the corresponding MIPI instructions are diverted instead to the USB-3 interface.

The smartphone will typically control normal operational modes of the RAW peripheral through a dedicated camera 'app' or application, although these could also be exposed as an API at the OS level. In the latter case 3$^{rd}$ party 'apps' could access the API and thus directly control the RAW peripheral.

Image Acquisition Mode

In this mode the various image acquisition settings are programmed on the peripheral as with any conventional digital camera. The peripheral will provide a fully automatic mode of image capture, one or more semi-automatic modes and a full manual mode. Optionally the peripheral may be programmed to provide more scene-specific 'smart' modes, but as these will typically require image post-processing and are controlled from the smartphone they are not considered here.

(i) Full Auto Mode

In the automatic mode the peripheral is configured to implement self-contained auto-focus and exposure of the imaged scene. In this mode the peripheral control subsystems and ISP continually analyze the acquired preview scene and choose the optimum shutter speed, aperture, ISO and flash settings for image acquisition.

Once set into this mode the peripheral activates and acquires images constantly and adjusts lens, exposure timing and ISP processing to optimize the acquired scene. Typically this may require some buffering of image frames to perform frame-to-frame calculations and thus the RAW image store is accessed by the ISP as required. In some embodiments the acquired image stream will be reduced from full resolution enabling greater control over the frame-to-frame processing and allowing multiple image frames to be buffered.

As the user requires to view the imaged scene in order to compose an image the acquired and partly processed (at Bayer level) preview image stream is transmitted over the USB-3 interface to the attached smartphone for display. Additional processing on the smartphone is limited to conversion from Bayer to YCC or similar format suitable for real-time display on the smartphone screen. Typically the user does not have direct control over focus, exposure, white balance, or any other camera parameters, but it may be possible in some embodiments to adjust parameters such as ISO to control the sensitivity of the 'auto' algorithms.

When the user decides to acquire an image this may be actuated on the smartphone, or by pressing a capture button on the peripheral. In the first case a command is sent via the USB to MIPI interface module to instruct the ISP to acquire a full resolution RAW image frame and transmit this to the smartphone via a MIPI to USB transfer. Any acquisition metadata may also be transferred together with status information immediately preceding or following the image transfer.

In some embodiments where a HDR mode is available a first frame will be acquired and transferred, camera settings may be changed and a second image frame is acquired and also transferred together with any relevant image frame metadata. If some Bayer level processing is employed as part of the process to create a combined HDR image then the first frame may be temporarily stored in the RAW image store on the peripheral. Image frame metadata from one or both image frames may optionally be transmitted. In certain embodiments more than two image frames may be acquired to create a HDR image. Typically each frame acquisition will be with different acquisition parameters, although this is not a requirement and in certain embodiments more than one frame with the same camera settings may be acquired as references images.

After transmitting to the smartphone the RAW image frames are further processed by the ISP of the smartphone camera subsystem. This process is essentially the same as if the image had been acquired by the smartphones camera and sensor, but the smartphone now has access to improved RAW images with better optical quality due to the use of a DSLR lens unit and a larger full-frame or APS-C image sensor.

(ii) Semi-Automatic Modes

These provides a mode found on DSLR cameras where the user may select a particular acquisition parameter, e.g. exposure time, aperture, etc. The most commonly found modes are: AV (Aperture-Priority), TV or S (Shutter-Priority) and P (Programmed Auto).

Aperture-Priority allows the photographer to set the aperture value and the peripheral automatically sets the correct shutter speed; TV lets the photographer choose the shutter speed first (for example when shooting sports) and the camera automatically sets the correct aperture. P-Program mode is similar to Auto mode—the shutter and the peripheral determines aperture settings, but the photographer can adjust the shooting and image-recording functions.

Alternatively, some of these modes are sometimes presented as being suitable for specific scene contexts or shooting conditions. As examples:

Portrait Mode (P):

In this mode the peripheral subsystems are configured to assume a subject in the foreground of the frame and choose a shallow depth of field in order to keep the human subject in focus but the background blurred. In low-light situations a flash may be activated.

If the peripheral reads the scene as dark, it may be able to add fill-in flash, increasing the luminance of certain regions of the image. This must be implemented at Bayer level and may not be feasible. In particular, it is best applied selectively to facial regions and optionally to strongly shadowed foreground regions. However with implementation of a basic face-detection or foreground mapping as part of the ISP hardware this can be more effectively implemented.

Landscape Mode:

Typically uses a small aperture (high f/number) to create a well-focused image from the foreground into the distance. Landscape mode tends to suit a wide lens, and again works well if the scene is well lit. Flash is normally disabled.

Sports Mode:

Because sports are fast paced activities, sports mode uses high shutter speed of at least 1/500-1/1000 of a second. With a high shutter speed to freeze movement, it means that flash is normally disabled and a brightly lit scene is required. Sports mode can work well alongside continuous shooting mode, where images are taken consecutively—the result is, for example, a number of shots capturing action in mid air.

Night Portrait:

In the night portrait mode, the peripheral control systems and ISP try to balance the darkness of the background with the need to light the subject in the foreground. The aperture will have to be wide to allow sufficient light to capture the background and keep the subject in focus, but at the same time flash is required to illuminate the subject and avoid blur. Sometimes the night portrait mode will double flash, creating an unusual double exposure look.

These 'semi-automatic' modes are distinguished from 'smart-scene' modes where additional, post-acquisition, image processing is required. Often this employs multiple image frames. Some modern smartphones and cameras have a very long list of such 'smart' modes.

In a sense, two-image HDR is an example of such a 'smart-scene' but because it has become so prevalent in modern smartphones it makes sense to modify the imaging peripheral and Bayer ISP to accommodate this particular form of image acquisition.

(iii) Manual Mode

Figure 6:
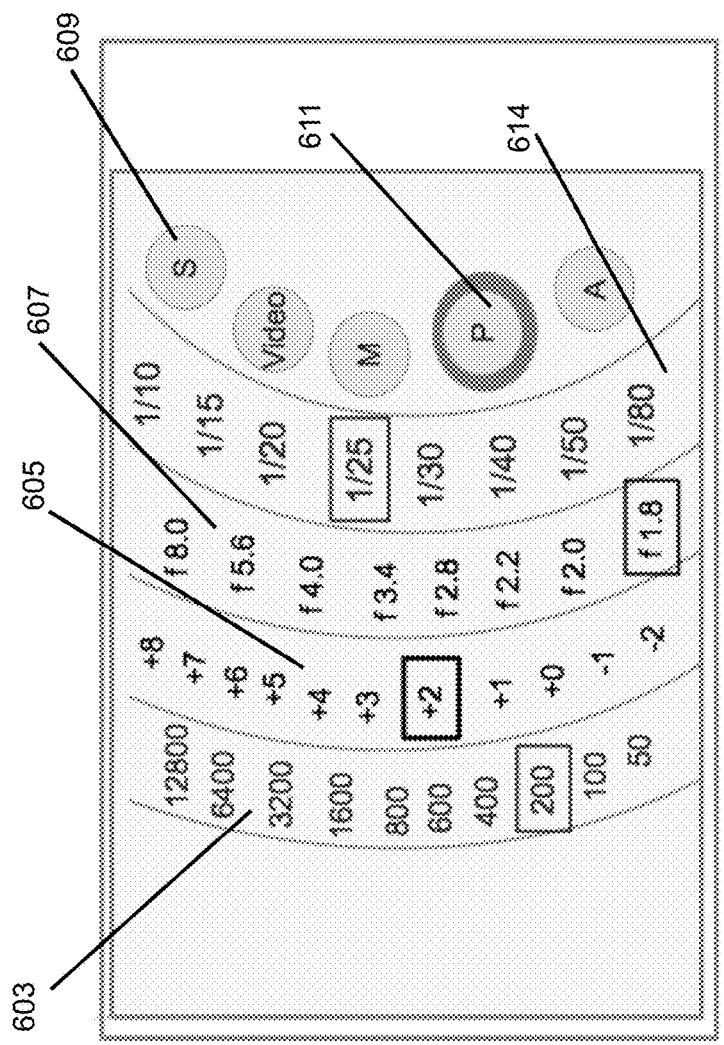
FIG. 6: Exemplary smartphone interface used to control camera settings (ISO, EV number, aperture and 'equivalent' exposure time) available in smartphone camera app.

In full manual mode the RAW peripheral does not make any attempts to adjust settings. Instead these are set manually—either by external switches and dials on the peripheral itself, or from the smartphone UI. An example of a manual UI for a smartphone is shown in FIG. 6. This enables the user to directly set the ISO, white balance, exposure time and aperture (f-stop) of the camera. Manual adjustment of focus, noise suppression and optical stabilization may also be provided where such subsystems are incorporated into the RAW peripheral.

In response to such settings the peripheral will acquire and process RAW images and transmit these to the smartphone, thus the user can see the effects of the various settings from the preview stream transmitted from peripheral to smartphone. The exact settings may vary for different embodiments, but will mirror those available on today's DSLR and mirrorless cameras.

There is a particular need for advanced user interfaces that will provide simplified access to complex camera settings. Some exemplary embodiments will be presented below.

(iv) 'Smart' Scene Modes (with Post-Processing)

These will typically require multi-frame image post-processing and are thus controlled from the smartphone. In such modes the smartphones would simply manipulate the peripheral to capture multiple sequential image frames, possibly with different acquisition setting as described below.

Some examples include:

Best Face Mode:

This captures multiple image frames of a group of people and allows the user to select the best face from each; typically it captures at least 5 consecutive image frames.

Beauty Modes:

This modifies a portrait image and is mainly based on image post-processing, although some features may require two or more consecutive image frames to be acquired with different camera settings on the peripheral.

Bokeh and Smart-Portrait Modes:

Bokeh mode blurs the background in a controlled manner and normally it is sufficient to acquire two consecutive image frames with different focus settings. Some 'smart-portrait' modes can provide Bokeh-like blur without a need for the computationally complex blurring required to simulate lens blur—these typically require 3 consecutive image frames to be acquired.

Night Portrait or Low-Light Modes:

Basic night portrait mode uses controlled exposure and camera flash to capture a single image, but it can be improved using separate image frames with flash and no-flash settings and combining the two.

A range of other flash/no-flash techniques are described in, for example, "Digital Photography with Flash and No-Flash Image Pairs" by Petschnigg et al from Microsoft Research and available at: http://research.microsoft.com/en-us/um/redmond/projects/flashnoflash/

Another low-light technique involves capturing a blurred image with full exposure and an unblurred image with short-exposure time. The two images can be combined to generate a sharp low-light image.

Focus Stacking or Refocus:

Another technique is to acquire multiple images with different focus setting and combine the 'in-focus' parts of each image. In other examples these may be stored in a container file providing a means to re-focus an image.

HDR De-Ghosting:

Motion that occurs between the two HDR image frames leads to a ghostly effect where a face, or body has moved between the two image frames. It is possible to remove such 'ghosts' by careful and advanced post-processing but this will be computationally expensive and would not be implemented on the RAW peripheral described here.

In such 'smart' modes the main computation and post-processing will be implemented on the smartphone, which will typically incorporate a multi-core CPU and GPU units to facilitate such advanced image processing algorithms. The peripheral does not need to provide any of the processing for such mode, only to provide the raw images with appropriate settings as requested by the smartphone.

Video Acquisition Mode

Video mode may be selected via the smartphone, or from a switch on the RAW peripheral. Once this mode is activated the peripheral switches to continuous acquisition and transfer of image frames to the smartphone. The Bayer ISP is set into a fixed configuration (e.g. ISO, noise suppression and Bayer processing modes) although it may still be adjusted by the focus and exposure subsystems. And the ISP can continue to provide basic image frame analysis (histogram & focus feedback) to these subsystems as in the auto-camera mode.

In a preferred embodiment full resolution image frames are transmitted to the smartphone over USB-3 at 30-60 frames per second. Post-processing and compression to an MPEG stream is delegated to the smartphone which uses the same compression engine as it would for native images. If the video resolution supported on the smartphone is less than that provided by the peripheral then 'full resolution' from the peripheral may be re-sized to the smartphone resolution before transfer over USB-3.

It is envisaged that at least 1080p HD video would be provided, but 4K video is more likely to become the standard for smartphones as high-speed LTE networks are deployed. In any case the video capabilities of the peripheral and smartphone would be part of the initialization process described previously.

Smartphone Workflows

The peripheral is primarily designed to substitute for the inbuilt camera of the smartphone at the RAW level. Thus it is optimized for the acquisition and Bayer-level processing of image sensor data and to provide DSLR equivalent focus, exposure and image frame calibration capabilities for DSLR or APS-C sized image sensors.

Image transfers are optimized to minimize transfer lag, and image data can be transferred directly to the host smartphone with only a small lag as the image bitstream passes through the Bayer ISP on the peripheral.

These raw images are processed on the smartphone using the phone ISP and treating the Bayer images as if they had originated from the smartphone camera subsystem. Thus all of the advanced smart-scene processing can be available on the smartphone, but using higher quality RAW images due to the DSLR quality optics and sensor.

Advanced User Interface Embodiments

As mentioned above, most of the higher level imaging capabilities of the smartphone can still be used, taking advantage of higher image quality obtained from the RAW module. However, in order to correct set the acquisition parameters for said module when operating in semi-automatic or full manual modes it is necessary to provide the user with simplified access to these settings.

In this regard FIG. 6 provides an example of a typical user interface in use by hybrid camera devices such as the Samsung Galaxy camera or the Nokia 818 or 1020 cameraphones.

Note the mode selection switches to the right that provide a standard range of modes used in DSLR or mirrorless cameras. These are summarized by table 1 below:

TABLE 1

Acquisition modes for a typical DSLR camera.

| Mode | Shutter Speed | Aperture |
|---|---|---|
| P (programmed auto) | Selected by camera | Selected by camera |
| S (shutter-priority auto) | Selected by photographer | Selected by camera |
| A (aperture-priority auto) | Selected by camera | Selected by photographer |
| M (manual) | Selected by photographer | Selected by photographer |

It can be seen that these are quite complex and would be found confusing by a novice user. The different modes are activated by selecting the appropriate switch, for example the 'S' mode or shutter-priority can be actuated by switch [609]. The current selected mode is highlighted in the user interface, in the example of FIG. 6 it is the 'P' mode, or programmed auto switch [611].

Depending on the selected mode and according to table 1 above the user will have access to some of the camera acquisition setting dials, namely ISO [603], EV or exposure number [605], f-stop or aperture size [607] and shutter speed [614]. The settings that are auto-selected by the camera can not be changed and are typically greyed-out or there user interface elements are shown as inactive. For an inexperienced user this can be quite confusing. A further problem is that the user does not have direct access to the preview of the scene when setting acquisition parameters from a user interface as shown in FIG. 6.

Figure 8:
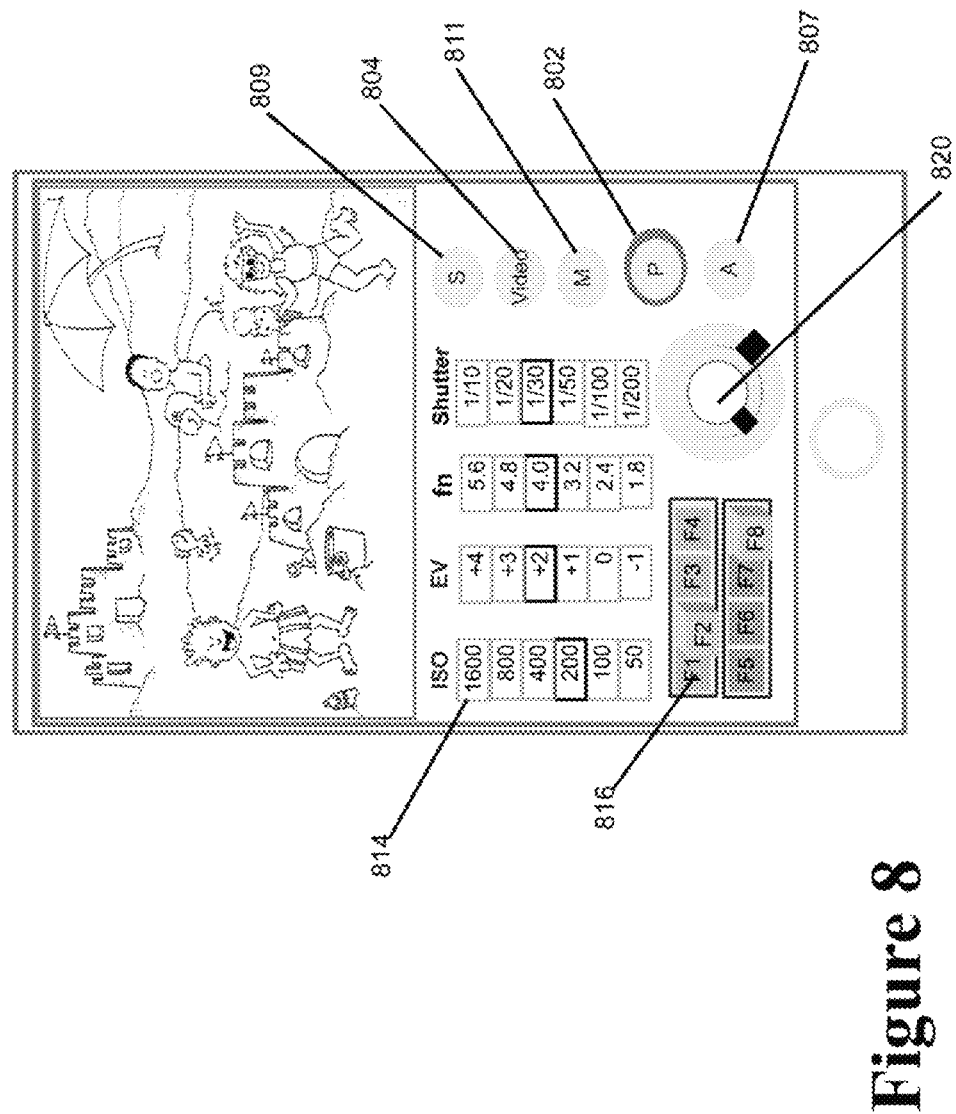
FIG. 8: Exemplary Smartphone User Interface for RAW Camera Peripheral.

Accordingly, in FIG. 8 we show an alternative user interface corresponding to the vertical alignment of the smartphone. A live-view' preview of the imaged scene is provided on the smartphone screen. This is streamed directly from the RAW module and may be optionally subsampled on the RAW module to reduce resource requirements on the smartphone device.

It will be seen from FIG. 8 that all of the main camera acquisition parameters are provided [814] as rotary-dial switched as commonly found on smartphone user interfaces (e.g. to set alarm times). The user may conveniently flick through settings and observe the effects on the 'live-view' image stream. In addition different modes may be selected as shown to the right with S-mode [809], P-mode [802], A-mode [807] and full manual [811] available. A dedicated video mode is also provided [804]. Typically, in video mode there may be less control over image acquisition, although this will depend on the underlying capabilities and computational resources available both within the RAW module and the connected smartphone.

In addition a range of programmable 'f-buttons' [816] may be provided. These can provide access to a range of advanced filters available on the smartphone. Examples include image analysis functions such as red-eye filter, face tracking, beauty filters, smile or blink detection, and so on. These may be programmed by the user, or some may be provided with a dedicated function, e.g. flash on/off or red-eye on/off. In some embodiments these switched could cycle through multiple modes of a filter, or select how to combine two or more filters that are commonly used together.

Figure 9:
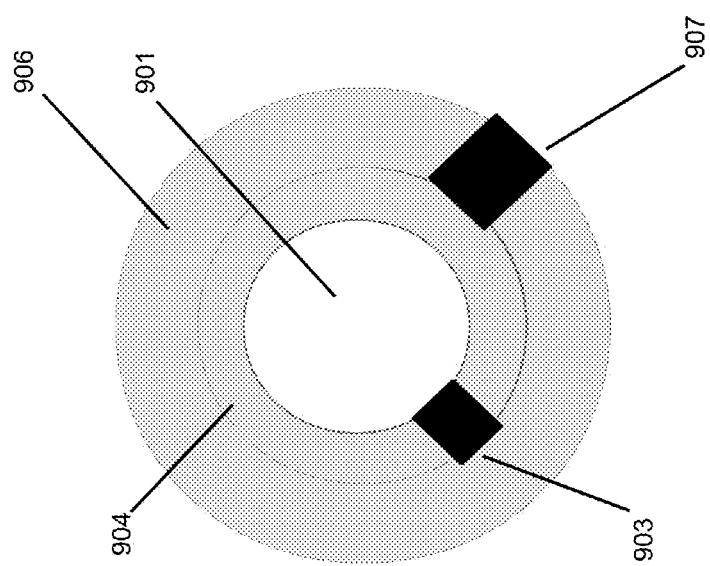
FIG. 9: Main acquisition control button with multi-functional rotary sliders providing convenient access to main acquisition functions.

Finally a specialized main acquisition & control button [820] is provided to provide access to common adjustments and final acquisition decision. This is detailed in FIG. 9 where one embodiment with two concentric rings is shown. This has a central active region [901] and at least one additional concentric ring control [904] with a rotary slider [903]. As it is a software interface element this control can have additional rings and in this example a second ring [906] is provided with corresponding rotary slider [907].

The central active region [901] actuates primary image acquisition, or in video mode it initiates or pauses the record function. The surrounding rotary sliders provide means to adjust various camera parameters, depending on the exact configuration. In a basic example these rings can provide intuitive and interactive access to manual lens focus of the RAW module. Thus moving the rotary slider to the left moves focus closer to the macro point, to the right focus moves towards infinity. The second ring could provide access to a zoom function, where the lens module supports optical zoom. Movement of these rotary sliders is converted to MIPI commands and transmitted over the USB interface to the RAW module where these commands are sent to the lens/focus subsystems. Thus the user can directly access the lens control module of the RAW module using these convenient rotary sliders.

Figure 11:
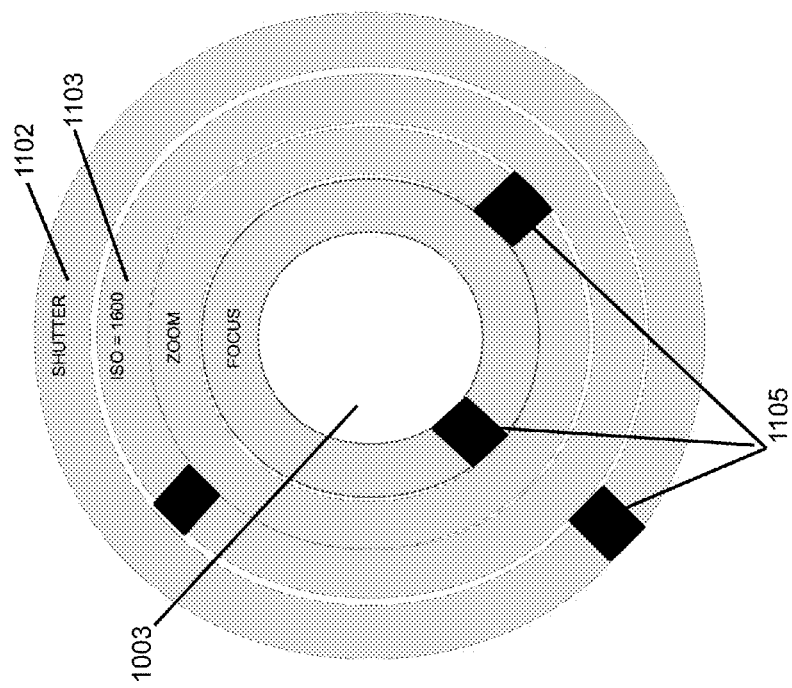
FIG. 11: Detailed view of extended acquisition control button showing access to multiple acquisition settings.

A more detailed example of an expanded acquisition & control (A&C) button is shown in FIG. 11. As it is a software component this button can be programmed in a variety of modes to match the various complex settings of a DSLR camera. According to the relevant mode only a subset of the acquisition parameters are provided and the number of control 'rings' will vary accordingly. In the example of FIG. 11 the A&C button is modified for shutter priority. Thus it offers, in addition to focus and zoom functionality the ability to control shutter speed [1102] and ISO setting [1103]. Each control ring is adjusted by moving the relevant rotary slider [1105].

Figure 10:
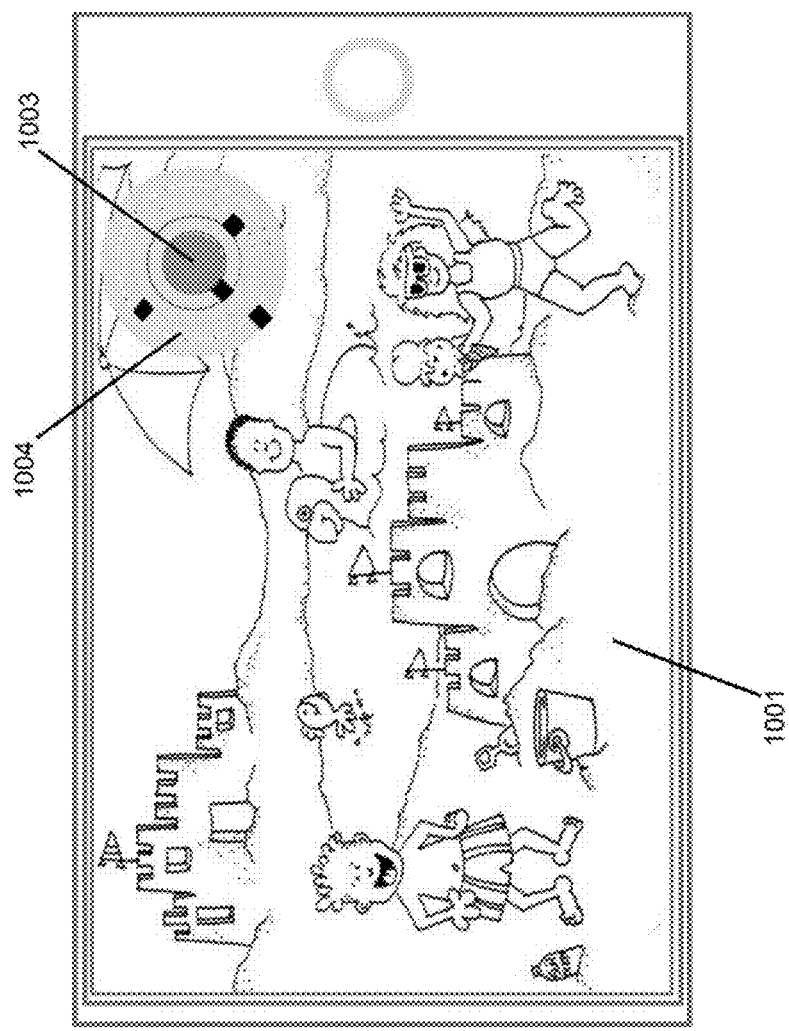
FIG. 10: Extended acquisition control button overlaid on main live-view image, enabling convenient access to multiple acquisition settings and providing guide to correct acquisition conditions.

The advantage of this unified A&C button is shown in FIG. 10. Here we see that this single control element can be overlaid on a full-screen 'live-view' image without interfering significantly with the composition of a photograph. The user may conveniently adjust the various setting provided by the rotary sliders [1004] and observe the effects in the main 'live-view' image [1001].

One additional aspect of the A&C button can be seen from FIG. 10—the central acquisition area of the A&C button [1003] can provide an color-coded indicator as to the suitability of the acquisition settings. Thus this central area can cycle through a range of colors from red-orange-yellow-green indicating the likely quality of the final image. This also enables the user to learn about the use of different camera settings such as shutter speed and aperture and how they effect overall quality of the acquired image.

By taking advantage of the advanced user-interface capabilities of a smartphone these user interface improvements as described above can greatly simplify the access of users who are unfamiliar with DSLR and mirrorless cameras to the capabilities of RAW camera module. Claims relating to these user interface improvements are appended below.

A handheld imaging peripheral is described to provide high quality RAW image data. The device incorporates a lens mount that can accommodate an interchangeable lens unit and a number of external controls to enable image acquisition settings to be adjusted by the user. The peripheral is configured to communicate with a smartphone, or similar handheld device. The peripheral can have a larger dimension, particularly with respect to the thickness of the handheld device, thus overcoming some of the physical limitations to providing high quality optics and image sensing within the thin form factor of a modern smartphone. By providing external controls, similar to those found on high-end digital cameras, the user can experience an improved photographic experience using their smartphone to post-process, enhance, display and store the acquired images or video. The user avoids the cost and inconvenience of purchasing and carrying a separate digital camera and gains the connectivity and sharing capabilities of the smartphone.

An improved smartphone photographic experience is provided by using an external imaging peripheral. The peripheral is connected to the smartphone via a USB-3, or similar high-speed data bus and is configured to capture RAW image data of a higher quality than is possible with the smartphone's camera. The smartphone can be configured to disconnect its own camera and accept images from the peripheral over the high-speed data bus. A user interface displayed on the touch-screen of the smartphone enables the peripheral to be controlled, specifically the acquisition of a next image or activating a video recording. Additional control functions may include adjustment of the acquisition settings on the peripheral. Images from the peripheral are analyzed, processed and enhanced on the smartphone. Thus advanced image processing techniques available on the smartphone can be applied to images obtained from the peripheral. Images may be displayed, stored and transmitted over a network by the smartphone.

Improved user interfaces are provided to simplify adjustments to the acquisition settings of a camera peripheral from an attached smartphone device. In one embodiment a 'live view' image stream is provided by the peripheral and displayed on the smartphone display with a range of touch controls for adjusting acquisition settings on the peripheral. As these are adjusted the user may observe the practical effects of the adjustments on the 'live view' image. The user may optionally select a range of post-processing filters implemented on the smartphone and observe the effect of such filters.

In another embodiment a full-screen 'live view' is provided on the smartphone and a single, multi-component, control widget is overlaid on the 'live view'. This component incorporates one or more concentric rings with rotary sliders that can be used to adjust a range of settings for acquisition parameters dependent on the acquisition mode selected for the camera peripheral. User feedback is provided via a central circular region that changes color responsive to the 'goodness' of the selected acquisition settings. This central region also provides control means to actuate an image acquisition or to commence a video recording.

According to some but not necessarily all embodiments, there is provided: A handheld imaging device comprising a lens and image sensor for acquiring digital images, further comprising: a set of external controls provided on the device; an image signal processor configured to perform processing on a Bayer image obtained from said sensor; communication means to transmit said processed Bayer image to a second device; wherein device settings on the external controls are transmitted to the second device, said device further analyzing, processing and/or displaying the images transmitted based in part on the settings of the external controls.

According to some but not necessarily all embodiments, there is provided: A peripheral for a handheld imaging device comprising a lens and image sensor for acquiring digital images, further comprising: an image signal processor configured to perform processing on a Bayer image obtained from said sensor; an interface module configured to convert a MIPI data stream into a USB-3 data stream; and further configured to receive commands from the handheld imaging device including at least a command to acquire a next image; and control means within the handheld imaging device to disable its internal imaging subsystem; and communication means between handheld imaging device and peripheral to enable the exchange of data and command codes; wherein the handheld imaging device disables its internal imaging subsystem, issues a command to the peripheral to acquire a next image and transmit said image via the communication means.

According to some but not necessarily all embodiments, there is provided: A smartphone peripheral configured to connect to an external communications port on the smartphone providing means to acquire, pre-process and transmit RAW digital image data; further comprising, a user interface means provided on said smartphone, including a 'live-view' of the imaged scene and control elements to enable selection and adjustment of a range of acquisition parameters and acquisition modes of said peripheral, and communication means to deliver control codes to actuate said selections and adjustments, trigger an image acquisition and transmit the acquired image to the smartphone, wherein, prior to image acquisition said peripheral continuously acquires images, said communications means continuously transmits images and said smartphone continuously receives and displays said images to provide the user with a 'live view' display.

According to some but not necessarily all embodiments, there is provided: A touch sensitive user interface element comprising: a central actuation region of approximately circular shape; one or more rings concentric with said actuation region, each equipped with at least one rotary slider; wherein, at least one of the rotary sliders performs a focus or zoom adjustment in a separate peripheral configured to acquire digital images, and the interface element is displayed on a smartphone touchscreen, said phone being communicatively coupled to said peripheral.

According to some but not necessarily all embodiments, there is provided: A handheld imaging device comprising a lens and image sensor for acquiring digital images, further comprising: an image signal processor configured to perform processing on a Bayer image obtained from said sensor; an interface module configured to convert a MIPI data stream into a USB-3 data stream; and further configured to receive commands from a second USB-3 device and to transmit image metadata, including at least image acquisition parameters associated with a Bayer image to said second device.

According to some but not necessarily all embodiments, there is provided: A handheld image capture peripheral, comprising: a lens and/or a lens mount configured to attach a lens; an optical sensor configured to capture RAW image data; and an I/O interface configured to transmit said RAW image data out of the peripheral, said RAW image data not being demosaiced prior to said transmission.

According to some but not necessarily all embodiments, there is provided: A handheld image capture peripheral, comprising: a lens and/or a lens mount configured to attach a lens; an optical sensor configured to capture RAW image data, using said lens or an attached lens, in at least partial dependence on one or more image acquisition parameters comprising one or more of focus, exposure and zoom settings; and an I/O interface configured to transmit out of the peripheral said RAW image data with image metadata that describes said RAW image data and includes at least said image acquisition parameters.

According to some but not necessarily all embodiments, there is provided: A handheld image capture peripheral, comprising: a lens and/or a lens mount configured to attach a lens; an optical sensor configured to capture RAW image data; an image signal processor configured to pre-process said RAW image data; and an I/O interface configured to transmit out of said peripheral said pre-processed RAW image data, wherein said pre-processing comprises one or more of: optical black compensation, pixel defect compensation, fixed pattern noise compensation, lens shading compensation, gains and offsets adjustment, 3A statistics generation and storage, Bayer scaling, and image resizing.

According to some but not necessarily all embodiments, there is provided: A handheld mobile processing unit, comprising: a camera comprising a lens and a sensor; an I/O interface configured to transmit and receive data and commands into and out of the mobile unit; and an image signal processor configured to receive RAW image data from said camera and process said image data into a display-ready format; wherein said image signal processor is configured, on receipt of a command to use a physically distinct imager to capture an image, to use said I/O interface to transmit said capture-image command out of the mobile unit, and to process RAW image data received via said I/O interface in response to said command transmission into a display-ready format.

According to some but not necessarily all embodiments, there is provided: A handheld mobile processing unit, comprising: a camera comprising a lens and a sensor; a display; an I/O interface configured to transmit and receive data and commands; and an image signal processor configured to receive and process image data captured by said camera, to process into display-ready format a RAW video image data stream received by said I/O interface from a device physically distinct from the handheld mobile unit, and to cause said display to display said processed video stream live with respect to said receipt of said video image data stream; wherein said RAW video image data stream is not demosaiced prior to said receipt.

According to some but not necessarily all embodiments, there is provided: A handheld mobile processing unit, comprising: a camera comprising a lens and a sensor; an I/O interface configured to transmit commands to and receive data from a device physically distinct from the mobile unit; and an image signal processor configured to receive RAW image data from said camera and process said image data into a display-ready format; wherein said image signal processor is configured, on receipt of a command to use a physically distinct imager to capture an image, to use said I/O interface to transmit said capture-image command to the physically distinct device, and to process RAW image data received via said I/O interface in response to said command transmission into a display-ready format in at least partial dependence on said image acquisition parameters; and at least one of: wherein said I/O interface is configured to enable user selection of image acquisition parameters, wherein said image signal processor is configured to use said I/O interface to transmit said image acquisition parameters to said physically distinct device on receipt of said capture-image command; and wherein said image signal processor is configured to perform said processing using image acquisition parameters received from said I/O interface with said RAW image data and not selected using the mobile unit.

According to some but not necessarily all embodiments, there is provided: An image capture and processing system, comprising: a handheld peripheral image capture unit, comprising: a peripheral lens and/or a lens mount configured to attach a peripheral lens; a peripheral sensor configured to capture RAW image data, said peripheral sensor having a larger sensing surface than said mobile unit sensor; a peripheral I/O interface configured to transmit at least said RAW image data, said RAW image data not having been demosaiced, to said handheld mobile I/O interface; and a handheld mobile processing unit physically distinct from said handheld peripheral image capture unit, comprising: a camera comprising a mobile lens and a mobile sensor; a mobile I/O interface configured to receive at least said RAW image data from said handheld peripheral I/O interface; and a mobile image signal processor configured to process said RAW image data into a display-ready form.

According to some but not necessarily all embodiments, there is provided: An image capture and processing system, comprising: a handheld peripheral image capture unit, comprising: a peripheral lens and/or a lens mount configured to attach a peripheral lens; a peripheral sensor configured to capture a RAW video image data stream; a peripheral I/O interface configured to transmit live at least said RAW video image data stream, said RAW video image data stream not having been demosaiced, to said handheld mobile I/O interface; and a handheld mobile processing unit physically distinct from said handheld peripheral image capture unit, comprising: a camera comprising a mobile lens and a mobile sensor; a display; a mobile I/O interface configured to receive at least said RAW video image data stream from said handheld peripheral I/O interface; and a mobile image signal processor configured to process said RAW video image data stream into a display-ready form and to cause said display to display said display-ready video stream live with respect to said capture action.

According to some but not necessarily all embodiments, there is provided: An image capture and processing system, comprising: a handheld peripheral image capture unit, comprising: a peripheral lens and/or a lens mount configured to attach a peripheral lens; a peripheral sensor configured to capture RAW image data in at least partial dependence on image acquisition parameters comprising one or more of focus, exposure and zoom; a peripheral I/O interface configured to transmit at least said RAW image data, said RAW image data not having been demosaiced, to said handheld mobile I/O interface; and a handheld mobile processing unit physically distinct from said handheld peripheral image capture unit, comprising: a camera comprising a mobile lens and a mobile sensor; a mobile I/O interface configured to receive at least said RAW image data from said handheld peripheral I/O interface; and a mobile image signal processor configured to process said RAW image data into a display-ready form in at least partial dependence on said image acquisition parameters; wherein at least one of said mobile I/O interface and said peripheral I/O interface is configured to enable user selection of image acquisition parameters and to transmit said parameters to the other of said mobile and said peripheral I/O interfaces.

According to some but not necessarily all embodiments, there is provided: A method of capturing and processing images, comprising: capturing RAW image data using a sensor and a lens of a handheld peripheral; transmitting said RAW image data from said peripheral to a handheld mobile processing unit physically distinct from said handheld peripheral without demosaicing said RAW image data; and processing said RAW image data into a display-ready format using an image signal processor of said handheld mobile processing unit.

According to some but not necessarily all embodiments, there is provided: A method of capturing and processing images, comprising: capturing a RAW image data stream using a sensor and a lens of a handheld peripheral; transmitting said RAW image data stream from said handheld peripheral to a handheld mobile processing unit physically distinct from said handheld peripheral without demosaicing said RAW image data stream; processing said RAW image data into a display-ready format using an image signal processor of said handheld mobile processing unit; and displaying said display-ready image data stream as video using a display of said handheld mobile processing unit, wherein said transmitting and said processing are performed such that said video is displayed live with respect to said capturing.

According to some but not necessarily all embodiments, there is provided: A method of capturing and processing images, comprising: capturing RAW image data using a sensor and a lens of a handheld peripheral; transmitting said RAW image data from said peripheral to a handheld mobile processing unit physically distinct from said handheld peripheral without demosaicing said RAW image data; processing said RAW image data into a display-ready format using an image signal processor of said handheld mobile processing unit; and at least one of: selecting image acquisition parameters using said handheld mobile processing unit and parameter-transmitting said parameters to said handheld peripheral, wherein said capturing is performed in at least partial dependence on said parameters; and selecting image acquisition parameters using said handheld peripheral, wherein said transmitting transmits said parameters with said RAW image data; wherein said parameters comprise one or more of focus, exposure and zoom.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

REFERENCES

[1] C. Dainty, "Film Photography Is Dead: Long Live Film: What can Digital Photography Learn from the Film Era?," *IEEE Consum. Electron. Mag.*, vol. 1, no. 1, pp. 61-64, January 2012 [Online]. Available: http://ieeexplore.ieee-.org/lpdocs/epic03/wrapper.htm?arnumber=6107480. [Accessed: 29 Jul. 2013]

[2] J. Cho, S. Mirzaei, J. Oberg, and R. Kastner, "Fpga-based face detection system using Haar classifiers," in *Proceeding of the ACM/SIGDA international symposium on Field programmable gate arrays—FPGA '09*, 2009, p. 103 [Online]. Available: http://dl.acm.org/citation.cfm?id=1508128.1508144. [Accessed: 28 Oct. 2011]

[3] P. A. Tresadern, M. C. Ionita, and T. F. Cootes, "Real-Time Facial Feature Tracking on a Mobile Device," *Int. J. Comput. Vis.*, pp. 1-10, May 2011 [Online]. Available: http://www.springerlink.com/content/a0h707650870942h/. [Accessed: 1 Dec. 2011]

[4] M. Yang, J. Crenshaw, B. Augustine, R. Mareachen, and Y. Wu, "AdaBoost-based face detection for embedded systems," *Comput. Vis. Image Underst.*, vol. 114, no. 11, pp. 1116-1125, November 2010 [Online]. Available: http://dx.doi.org/10.1016/j.cviu.2010.03.010. [Accessed: 21 Jul. 2011]

[5] P. M. Corcoran, P. Bigioi, and F. Nanu, "Half-face detector for enhanced performance of flash-eye filter," in *2013 IEEE International Conference on Consumer Electronics (ICCE)*, 2013, pp. 252-253 [Online]. Available: http://ieeexplore.ieee.org/articleDetails.jsp?arnumber=6486882. [Accessed: 7 Oct. 2013]

What is claimed is:

1. An image capture and processing system, comprising:
    a handheld peripheral image capture unit, comprising:
        a peripheral lens and/or a lens mount configured to attach a peripheral lens;
        a peripheral sensor configured to capture RAW image data, said peripheral sensor having a larger sensing surface than a mobile unit sensor;
        a peripheral Input/Output (I/O) interface configured to transmit at least said RAW image data, said RAW image data not having been demosaiced, to said handheld mobile I/O interface; and
    a smartphone physically distinct from said handheld peripheral image capture unit, comprising:
        a camera comprising a mobile lens and said mobile sensor;
        a mobile I/O interface configured to receive at least said RAW image data from said handheld peripheral I/O interface; and
        a mobile image signal processor configured to process, including demosaicing, said RAW image data into a display-ready form.

2. The image capture and processing system of claim 1, said smartphone further comprising a display; wherein said peripheral sensor is configured to capture a RAW video image data stream; wherein said peripheral I/O interface is configured to transmit said RAW stream to said smartphone; and wherein said smartphone is configured to receive said RAW stream, process said RAW stream into a display-ready form, and display said processed stream on said display as live view video.

3. The image capture and processing system of claim 2, wherein said mobile I/O interface is configured to enable selection of a video mode and to transmit a corresponding video mode command to said peripheral I/O interface, and wherein said peripheral sensor is configured to initiate capture of said RAW video image data stream when said video mode command is received by said peripheral I/O interface.

4. The image capture and processing system of claim 2, said peripheral further comprising a peripheral image signal processor; wherein said peripheral image signal processor is configured to reduce to a lower resolution said RAW video image data stream prior to said transmission; and wherein, when a capture-image command is received by said peripheral, said peripheral I/O interface transmits to said mobile I/O interface said RAW image data at a higher resolution which corresponds to one or more image frames.

5. The image capture and processing system of claim 1, wherein said handheld peripheral further comprises a peripheral image signal processor configured to pre-process said RAW image data and cause said peripheral I/O interface to transmit said pre-processed RAW image data to said smartphone, wherein said pre-processing comprises one or more of: optical black compensation, pixel defect compensation, fixed pattern noise compensation, lens shading compensation, gains and offsets adjustment, statistics generation and storage, Bayer scaling, and image resizing.

6. The image capture and processing system of claim 1, wherein said display comprises a touch screen, wherein an image acquisition parameter selection interface is overlaid on said live view video display, wherein image acquisition parameters selected using said interface are transmitted by said mobile I/O unit to and received by said peripheral I/O interface, and wherein said RAW image data is captured and/or pre-processed in at least partial dependence on said selected parameters.

7. The image capture and processing system of claim 1, wherein said sensor is configured to capture said RAW image data in response to a user-entered capture-image command.

8. An image capture and processing system, comprising:
a handheld peripheral image capture unit, comprising:
a peripheral lens and/or a lens mount configured to attach a peripheral lens;
a peripheral sensor configured to capture a RAW video image data stream;
a peripheral Input/Output (I/O) interface configured to transmit live at least said RAW video image data stream, said RAW video image data stream not having been demosaiced, to said handheld mobile I/O interface; and
a smartphone physically distinct from said handheld peripheral image capture unit, comprising:
a camera comprising a mobile lens and a mobile sensor;
a display;
a mobile I/O interface configured to receive at least said RAW video image data stream from said handheld peripheral I/O interface; and
a mobile image signal processor configured to process, including demosaicing, said RAW video image data stream into a display-ready form and to cause said display to display said display-ready video stream live with respect to said capture action.

9. The image capture and processing system of claim 8, wherein said peripheral sensor has a larger sensing area than said mobile sensor.

10. The image capture and processing system of claim 8, said handheld peripheral further comprising an attachment interface to attach said handheld peripheral to said smartphone.

11. The image capture and processing system of claim 8, wherein said peripheral further comprises a peripheral image signal processor; wherein said peripheral image signal processor is configured to reduce to a lower resolution said RAW video image data stream prior to said transmission; and wherein, when a capture-image command is received by said peripheral, said peripheral I/O interface transmits to said mobile I/O interface said RAW image data at a higher resolution which corresponds to one or more image frames.

12. The image capture and processing system of claim 11, said smartphone further comprising a controller configured to disable said camera on receipt of said capture-image command by said smartphone.

13. The image capture and processing system of claim 8, wherein said mobile image signal processor is configured to access an internal bus of said smartphone to receive said RAW video image data directly from said mobile I/O interface.

14. The image capture and processing system of claim 8, wherein said mobile I/O interface is configured to allow a user to enter one or more of a physical aperture setting and a physical focus setting, and to transmit said settings to said peripheral I/O interface; said peripheral further comprising a lens controller configured to cause said peripheral lens to physically adjust in response to said settings.

15. An image capture and processing system, comprising:
a handheld peripheral image capture unit, comprising:
a peripheral lens and/or a lens mount configured to attach a peripheral lens;
a peripheral sensor configured to capture RAW image data in at least partial dependence on image acquisition parameters comprising one or more of focus, exposure and zoom;
a peripheral Input/Output (I/O) interface configured to transmit at least said RAW image data, said RAW image data not having been demosaiced, to a mobile I/O interface; and
a smartphone physically distinct from said handheld peripheral image capture unit, comprising:
a camera comprising a mobile lens and a mobile sensor;
said mobile I/O interface configured to receive at least said RAW image data from said handheld peripheral I/O interface; and
a mobile image signal processor configured to process, including demosaicing, said RAW image data into a display-ready form in at least partial dependence on said image acquisition parameters;
wherein at least one of said mobile I/O interface and said peripheral I/O interface is configured to enable user selection of image acquisition parameters and to transmit said parameters to the other of said mobile and said peripheral I/O interfaces.

16. The image capture and processing system of claim 15, said smartphone further comprising a display; wherein said peripheral sensor is configured to capture a RAW video image data stream; wherein said peripheral I/O interface is configured to transmit said RAW stream to said smartphone; and wherein said smartphone is configured to receive said RAW stream, process said RAW stream into a display-ready form, and display said processed stream on said display as live view video.

17. The image capture and processing system of claim 16, said peripheral further comprising a peripheral image signal processor; wherein said peripheral image signal processor is configured to reduce to a lower resolution said RAW video image data stream prior to said transmission; and wherein, when a capture-image command is received by said peripheral, said peripheral I/O interface transmits to said mobile I/O interface said RAW image data at a higher resolution which corresponds to one or more image frames.

18. The image capture and processing system of claim 16, said smartphone further comprising a controller configured to disable said camera on receipt of said capture-image command by said smartphone.

19. The image capture and processing system of claim 15, wherein said peripheral sensor has a larger sensing area than said mobile sensor.

20. The image capture and processing system of claim 15, wherein said mobile image signal processor is configured to access an internal bus of said smartphone to receive said RAW video image data directly from said mobile I/O interface.

\* \* \* \* \*